United States Patent
Huda

(10) Patent No.: US 7,442,301 B2
(45) Date of Patent: Oct. 28, 2008

(54) FILTER HOUSING APPARATUS WITH ROTATING FILTER REPLACEMENT MECHANISM

(75) Inventor: Stephen P Huda, Shelton, CT (US)

(73) Assignee: KX Technologies LLC, Orange, CT (US)

(*) Notice: Subject to any disclaimer, the term of this patent is extended or adjusted under 35 U.S.C. 154(b) by 215 days.

(21) Appl. No.: 11/511,599

(22) Filed: Aug. 28, 2006

(65) Prior Publication Data

US 2008/0047889 A1 Feb. 28, 2008

(51) Int. Cl.
*B01D 27/08* (2006.01)
*B01D 35/153* (2006.01)
*B01D 35/30* (2006.01)
*F25D 23/12* (2006.01)

(52) U.S. Cl. .................. 210/232; 210/234; 210/235; 210/249; 210/443; 210/450; 62/332; 62/389; 62/390

(58) Field of Classification Search ................ 210/232, 210/234, 235, 249, 443, 450; 62/332, 389, 62/390
See application file for complete search history.

(56) References Cited

U.S. PATENT DOCUMENTS

| | | | |
|---|---|---|---|
| 5,022,986 A * | 6/1991 | Lang ................. | 210/94 |
| 5,135,645 A | 8/1992 | Sklenak et al. | |
| 5,147,722 A | 9/1992 | Koslow | |
| 5,707,518 A * | 1/1998 | Coates et al. ........... | 210/232 |
| 5,914,037 A | 6/1999 | Yen | |
| 6,120,685 A * | 9/2000 | Carlson et al. .......... | 210/232 |
| 6,331,037 B1 | 12/2001 | Roscher et al. | |
| 6,360,764 B1 * | 3/2002 | Fritze .................. | 137/15.01 |
| 6,579,455 B1 * | 6/2003 | Muzik et al. ............ | 210/234 |
| 6,630,016 B2 | 10/2003 | Koslow | |
| 6,632,355 B2 | 10/2003 | Fritze | |
| 6,797,167 B2 | 9/2004 | Koslow | |
| 6,835,311 B2 | 12/2004 | Koslow | |
| 6,872,311 B2 | 3/2005 | Koslow | |
| 2001/0023843 A1 * | 9/2001 | Senner et al. ........... | 210/232 |
| 2004/0211717 A1 * | 10/2004 | Mitchell et al. ......... | 210/235 |
| 2004/0211931 A1 * | 10/2004 | Olson et al. ........... | 251/149.9 |

* cited by examiner

Primary Examiner—Thomas M Lithgow
(74) Attorney, Agent, or Firm—DeLio & Peterson LLC; Robert Curcio

(57) ABSTRACT

A filter assembly for fluid filtration having a push-activated lock and release mechanism. The filter housing has a sump for enclosing the filter media, a filter head, and at least one standoff protruding outwards for use in securing the filter head to a filter manifold. The filter manifold supports the filter housing with a filter locator. A filter guide having a rotator actuating mechanism secures and holds the filter head in place when the filter head is axially inserted. The rotator actuating mechanism has tabs and slots that rotate upon a transverse axial force from the standoff and from tabs on an internal shutoff. The internal shutoff has an inlet extension and an outlet extension with apertures for fluid ingress and egress. The internal shutoff tabs slidably contact and align the rotator actuating mechanism to secure and remove the filter head.

36 Claims, 12 Drawing Sheets

FILTER HOUSING ASSEMBLY

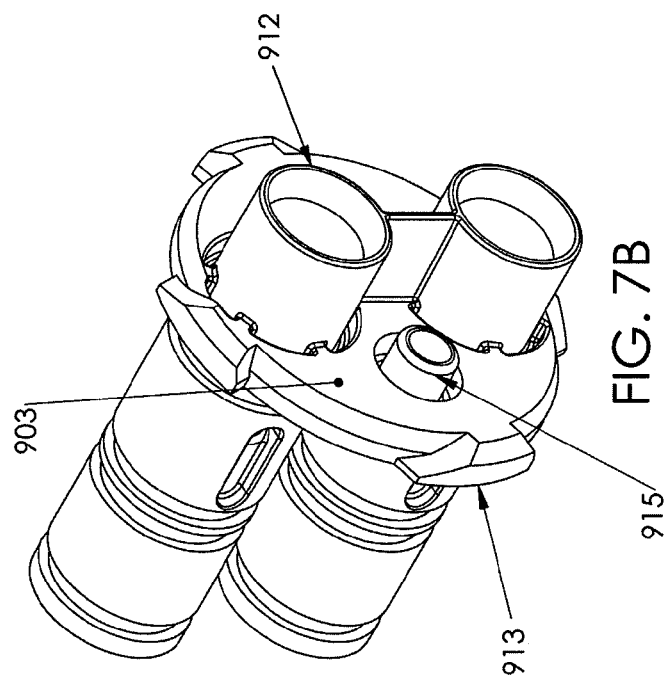
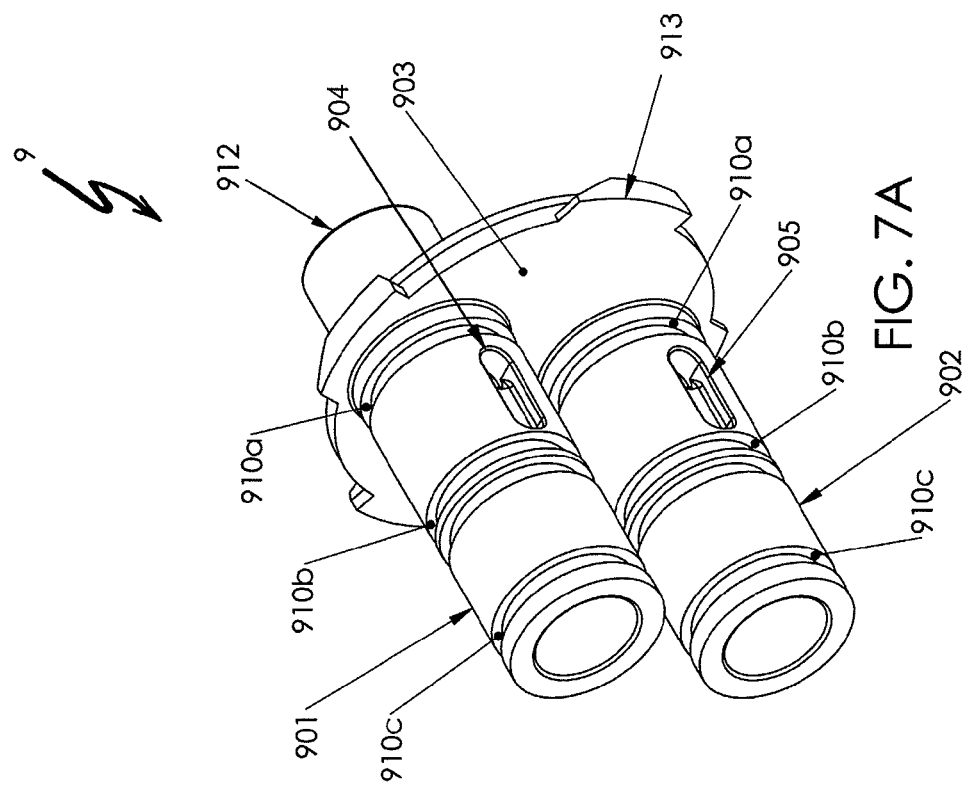
FIG. 7B
FIG. 7A

FILTER HOUSING APPARATUS WITH ROTATING FILTER REPLACEMENT MECHANISM

This invention relates to filtering apparatus, specifically a filter housing apparatus to facilitate easy removal and replacement of a filter housing from a mechanical support. The mechanical support is situated inline, and in fluid communication, with influent and effluent piping, such as within a refrigerator. More specifically, the invention relates to a filter housing and mount, whereby the filter housing may be attached to, and removed from, the mount by a push-actuated release. A controlled detachment of the filter sump, containing the filter media, is activated by the axial push of the sump towards the mechanical support. An internal shutoff, activated by the push-actuated release, blocks spillage during filter housing removal and replacement.

BACKGROUND OF THE INVENTION

The invention relates to a water filtration system having an automated mechanism for changing the filtration media when the filter has served its useful life. The use of liquid filtration devices is well known in the art as shown in U.S. Pat. Nos. 5,135,645, 5,914,037 and 6,632,355. Although these patents show filters for water filtration, the filters are difficult to replace owing to their design and placement. For example, U.S. Pat. No. 5,135,645 discloses a filter cartridge as a plug-in cartridge with a series of switches to prevent the flow of water when the filter cartridge is removed for replacement. The filter must be manually inserted and removed and have a switch activated to activate valve mechanisms so as to prevent the flow of water when the filter is removed. The cover of the filter is placed in the sidewall of a refrigerator and is employed to activate the switches that activate the valves. The filter access is coplanar with the refrigerator wall and forces an awkward access to the filter cartridge.

An in-line filter product sold by Whirlpool® employs a manual twist and turn filter replacement with a housing that can be mounted on a wall and manually tilted for access to the filter cartridge. Unfortunately, the filter is not automatically positioned for replacement by simple user touch, nor is the filter simply engaged via insertion of the filter sump with automatic locking of the filter sump. The multi-stage installment and twisting and turning mechanics of installation employed in the filter product are cumbersome and inconvenient to use. Furthermore, the Whirlpool® filter product is an inline water line filter and is not integrally part of any system which benefits from the use of filtered water.

The instant invention is particularly useful as the water filtering system for a refrigerator having water dispensing means and, optionally, an ice dispensing means. The water used in the refrigerator or water and ice may contain contaminants from municipal water sources or from underground well or aquifers. Accordingly, it is advantageous to provide a water filtration system to remove rust, sand, silt, dirt, sediment, heavy metals, microbiological contaminants, such as Giardia cysts, chlorine, pesticides, mercury, benzene, toluene, MTBE, Cadmium bacteria, viruses, and other know contaminants. Particularly useful water filter media for microbiological contaminants include those found in U.S. Pat. Nos. 6,872,311, 6,835,311, 6,797,167, 6,630,016, 6,331,037, and 5,147,722, and are incorporated herein by reference thereto. One of the uses of the instant filter apparatus is as a water filtration apparatus for a refrigerator. Refrigerators are appliances with an outer cabinet, a refrigeration compartment disposed within the outer cabinet and having a rear wall, a pair of opposing side walls, at least one door disposed opposite the rear wall, a top and a bottom and a freezer compartment disposed in the outer cabinet and adjacent to the refrigeration compartment. It is common for refrigerators to have a water dispenser disposed in the door and in fluid communication with a source of water and a filter for filtering the water. Further, it is common for refrigerators to have an ice dispenser in the door and be in fluid communication with a source of water and a filter for filtering the water. It has been found that the filter assembly of the instant invention is useful as a filter for a refrigerator having a water dispenser and/or an ice dispenser.

SUMMARY OF THE INVENTION

The present invention is directed to, in a first aspect, a filter assembly comprising: a filter housing which includes: a sump for enclosing a filter media; a filter head having an inlet and an outlet in fluid communication with the filter media, and at least one standoff located on the filter head housing, the at least one standoff protruding outwards from the filter head housing for use in securing the filter head to a filter manifold; the filter manifold comprising: a filter locator having a tray for mounting the filter head and supporting the sump; a filter guide having a rotator actuating mechanism to secure and hold the filter head in place when the filter head is axially inserted within the filter guide, the rotator actuating mechanism having tabs and slots that rotate upon a transverse axial force from the at least one standoff and from tabs on an internal shutoff; the internal shutoff having an inlet extension and an outlet extension with apertures for fluid ingress and egress, the in fluid communication with the filter head inlet and outlet during filtering operation, the internal shutoff tabs slidably contacting and aligning the rotator actuating mechanism to secure and remove the filter head; and a rear cover having inlet and outlet ports in fluid communication on an internal side with the filter head inlet and outlet ports, and in fluid communication on an external side with a fluid source. The rear cover may be configured for axial fluid flow through the inlet and outlet ports, or for radial fluid flow with the incorporation of a port manifold.

The filter media comprises an open end cap and a closed end cap, the open end cap having an inlet port for unfiltered water to enter the filter media and an outlet port for filtered water to exit the filter media. The open end cap includes standoffs to separate itself from the filter head's inside surface, such that influent fluid flow is not impeded when the open end cap is inserted within the filter head, and the fluid is able to flow peripherally about and through the filter media. A peripheral seal is circumferentially seated about the open end cap for sealing with the filter head.

The filter head comprises an inlet and an outlet mounting structure for the sump to provide for the passage of fluid from the filter head to the sump and then from the sump to the filter head. The filter head is in fluid communication with fluid entering the filter head from an external fluid source and has outlet means to permit fluid to exit the filter head after being filtered in the sump by a filter media contained therein. The filter head is mounted on a filter locater, whereby upon axial force applied to the sump to insert the filter head into the filter guide, the rotator actuating mechanism works as a cam when pushed by standoffs attached to the filter head to lock or release the filter head. This action facilitates the removal of the sump and the subsequent removal and replacement of the filter media. The filter head is guided along its directional path by the grooves located in the filter guide, which is held fixed by a filter locator. Upon insertion, the filter head works on compression springs, collapsing them while simultaneously rotating the rotator actuating mechanism. The filter head further includes track pins shaped to slidably secure to a tray.

The internal shutoff includes a plurality of fluid-tight seals about the inlet extension and the outlet extension such that fluid flow from the fluid source is blocked by the plurality of fluid-tight seals on the extensions when the internal shutoff is at least partially removed from the rear cover inlet and outlet ports, and wherein the internal shutoff inlet and outlet extensions are in fluid communication with the filter media when the filter head inlet and outlet are inserted within the internal shutoff inlet and outlet extensions. The filter guide further includes a first spring having a first spring constant and attached to the internal shutoff on a side closest to the fluid source, and a second spring having a second spring constant and attached to the internal shutoff on a side opposite the first spring, wherein the second spring constant is greater than the first spring constant, such that the first spring compresses and collapses before the second spring when axial force is applied simultaneously to both of the springs.

The rotator actuating mechanism preferably comprises a first internal rotator and a second internal rotator; however, it is also possible to form the rotator actuating mechanism from a one-piece construction, with the first internal rotator representing the lower portion and the second internal rotator representing the upper portion. In the two-piece design, the first internal rotator is interlocked with, and attached to, the second internal rotator. The first internal rotator includes tabs for directing and securing the standoffs when the filter head is inserted in the filter guide. The second internal rotator includes shaped slots that rotate the rotator actuating mechanism when transverse axial force is applied by the standoffs to the slots. Upon insertion of the filter housing, the filter head input and output prongs communicate first with the influent and effluent ports of the internal shutoff. Sealing gaskets on the filter head prongs create a liquid-tight seal with the internal shutoff ports. Continuing in the same axial force direction, the internal shutoff compresses the first spring as the filter head is pushed against the second spring, the second spring collapsing only when the first spring is fully collapsed and the internal shutoff is in contact with the rear cover. In this position, the internal shutoff permits fluid communication with the filter media. The filter head is inserted and secured within the filter guide. When the internal shutoff is moved in an opposite direction, fluid communication with the water source is prevented so that the filter housing can be removed without leakage or spillage. Motion of the filter housing during locking requires movement towards the filter guide, and then slight movement away from the filter guide. During this movement, the second spring continues to deliver axial force against the internal shutoff, holding it against the rear cover.

In a second aspect, the present invention is directed to a filter assembly having a filter head comprising: a first hollow cylindrical component of a first diameter, having an internal end and a external end, the first diameter large enough to mate with, and seal to, the sump; a second hollow cylindrical component of a second diameter, the second diameter smaller than the first diameter, the second cylindrical component located off axial center from the first cylindrical component and having a first end attached to the external end of the first cylindrical component, and an opposite second end wherein the filter head inlet and outlet extend from the second cylindrical component; the at least one standoff located on the second cylindrical component; at least one molded key located on the second cylindrical component to facilitate guiding the filter head into the filter guide; track pins located on the first cylindrical component and shaped to slidably secure the filter head to the tray.

The filter assembly apparatus of the instant invention may be used with a sump containing a filter media to provide a fluid treatment means for a fluid passing through a system. An example of a system involving fluid passage is a refrigeration system having water passageways for providing water for dispensing and also water for making ice cubes or other ice products. In such a system the refrigerator is attached to an incoming source of water that travels through installed lines to water dispensing and ice dispensing means. Owing to the known impurities in municipal water systems and household wells, it is beneficial to provide a water filtration system to remove contaminants in the water before it is dispensed as drinking water or used in the manufacture of ice, which is ultimately dispensed to a user for consumption.

The filter housing may have a filter head that is mounted using a water filter manifold for affixing the filter housing assembly to a surface. For example, the filter housing assembly may be mounted on a refrigerator wall or any surface associated with a refrigerator. The filter head is preferably contained in a water filter manifold, which can include a filter locator, a filter guide, an end cover, and a port manifold. The water filter manifold supports and holds the filter head such that they are placed in working configuration so the filter housing assembly cooperates in association with a device or apparatus that needs a fluid filtration system for a fluid it receives. The water filter manifold and associated filter head are also used in conjunction with a sump and filter media, whereby the combination of sump, water filter manifold, and filter head form the filtration device.

In a third aspect, the present invention is directed to a filter housing comprising: a sump for enclosing a filter media; a filter head having an inlet and an outlet in fluid communication with the filter media, the inlet and outlet including grooved tracks above and below a slotted aperture, the filter head being fixably attached to the sump in a watertight seal encasing the filter media, the head including: a first hollow cylindrical component of a first diameter, having an internal end and an external end, the first diameter large enough to mate with, and seal to, the sump; a second hollow cylindrical component of a second diameter, the second diameter smaller than the first diameter, the second cylindrical component located off axial center from the first cylindrical component and having a first end attached to the external end of the first cylindrical component, and an opposite second end wherein the filter head inlet and outlet extend from the second cylindrical component; at least one standoff located on the second cylindrical component; and a plurality of molded keys located on the second cylindrical component to facilitate guiding the filter head into a compatibly configured filter guide. The opposite end of the second hollow cylindrical component includes a flat surface to support the contact and compression of one or more springs.

In a fourth aspect, the present invention is directed to a refrigerator in combination with a filter assembly comprising: an outer cabinet; a refrigeration compartment disposed within the outer cabinet and having a rear wall, a pair of opposing side walls, at least one door disposed opposite the rear wall, a top and a bottom; a freezer compartment disposed in the outer cabinet and adjacent to the refrigeration compartment; a water dispenser disposed in the door and in fluid communication with the filter assembly with automated assembly for changing a sump and filter media from the refrigerator; the filter assembly comprising: a filter housing including: a sump for enclosing a filter media; a filter head having an inlet and an outlet in fluid communication with the filter media, and at least one standoff located on the filter head housing, the at least one standoff protruding outwards from the filter head housing for use in securing the filter head to a filter manifold; the filter manifold comprising: a filter locator having a tray for mounting the filter head and supporting the sump; a filter guide having a rotator actuating mechanism to secure and hold the filter head in place when the filter head is axially inserted within the filter guide, the rotator actuating mechanism having tabs and slots that rotate upon a transverse axial force from the at least one standoff and from tabs on an internal shutoff; the internal shutoff having an inlet extension and an outlet extension with apertures for fluid ingress and egress, the in fluid communication with the filter head inlet and outlet during filtering operation, the internal shutoff tabs slidably contacting and aligning the rotator actuating mechanism to secure and remove the filter head; and a rear cover having inlet and outlet ports in fluid communication on an internal side with the filter head inlet and outlet ports, and in fluid communication on an external side with the water source.

It is an object of this invention to provide a filter housing apparatus mounted on a surface and having an automatic locking mechanism for simple replacement and removal.

It is an object of this invention to provide a filter housing apparatus mounted on a surface having an automatic water shutoff activated during removal and replacement.

It is an object of this invention to provide a filter housing apparatus mounted on a surface having locking means with pressure activation for replacement and removal.

It is a further object of this invention to provide a filter housing apparatus for use with water dispensing and\or ice dispensing apparatus whereby filtered water is provided to the water dispensing and\or ice dispensing apparatus.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings in which:

FIGS. 7A & 7B are side plan views of the internal shutoff of the present invention.

DETAILED DESCRIPTION OF THE PREFERRED EMBODIMENT(S)

In describing the preferred embodiment of the present invention, reference will be made herein to FIGS. 1 to 16 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of the mechanical locking assembly of the filter housing without the need for excess force and tight tolerances essential in prior art filter housings makes for easy and frequent filter changes and optimal filter performance. The filter housing of the present invention provides simplified filter changes to minimize process downtime and without recourse to tools. A simple push mechanism actuates the self-driving release and change over means that hold and release the filter housing sump, and provide influent shutoff means to prevent leaking and spillage. Rotational shutoff and locking mechanisms are activated and released by axial force on the filter housing at the commencement of the filter changing procedure.

Figure 1:
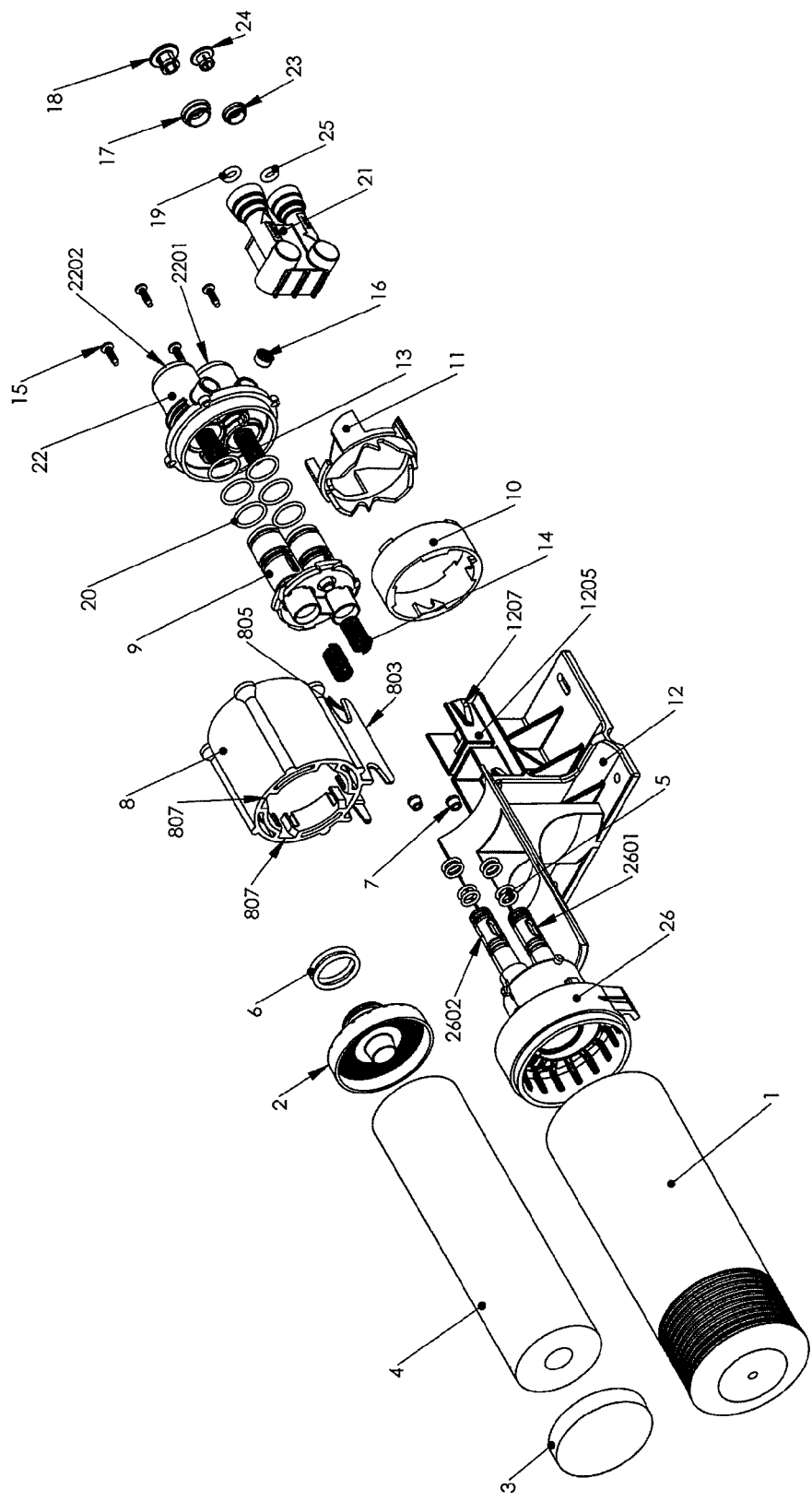
FIG. 1 is a top exploded view of the filter assembly of the present invention.
Figure 2:
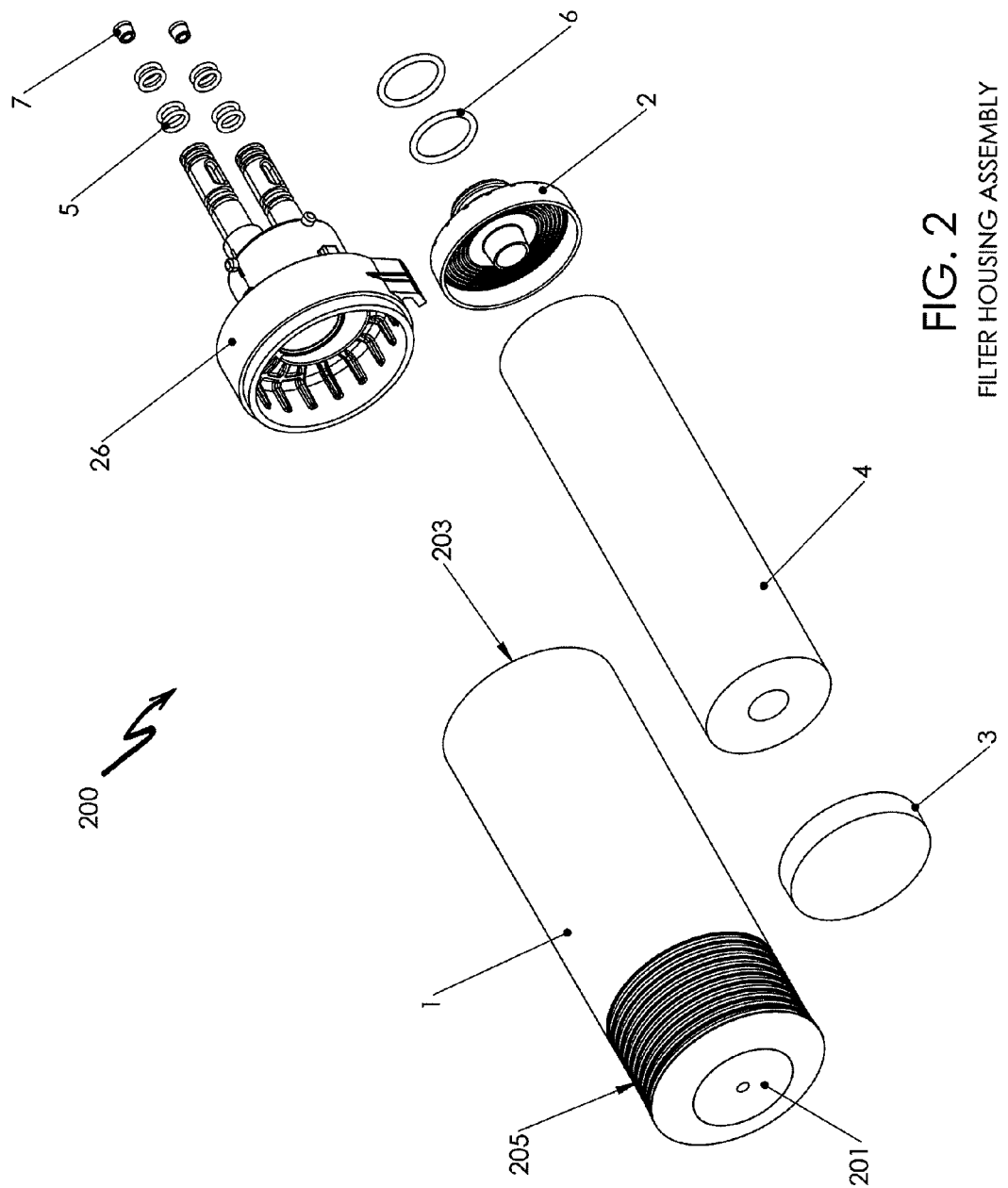
FIG. 2 is a top plan view of the filter housing assembly as shown in the filter assembly of FIG. 1.
Figure 3:
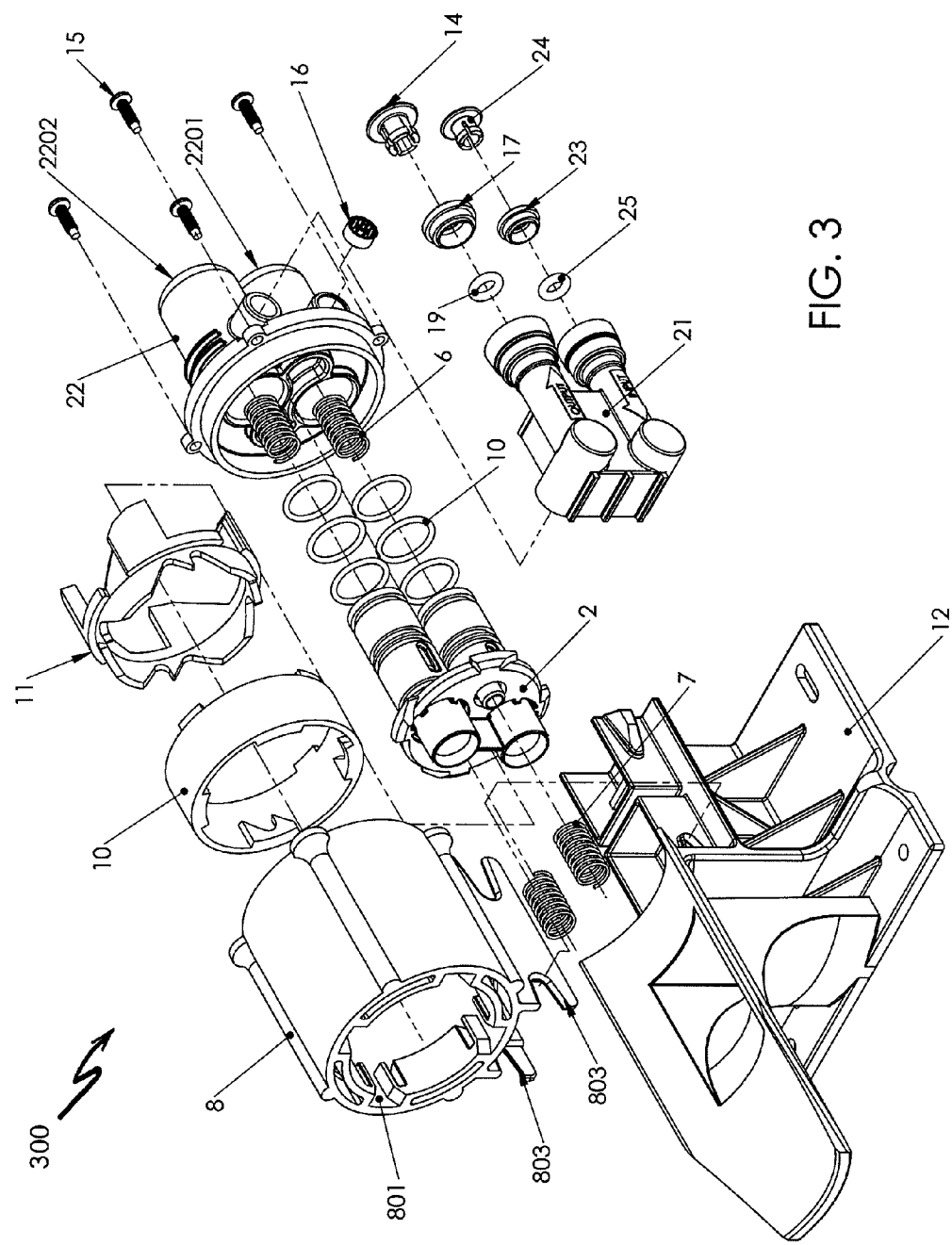
FIG. 3 is a side plan view of the water filter manifold as shown in the filter assembly of FIG. 1.

Referring to FIGS. 1-3, the filter assembly of the present invention includes a filter housing assembly 200 and a water filter manifold 300. Water filter manifold 300 is fixably secured in a position within an operating environment requiring fluid filtration, such as attached to an internal sidewall of a refrigerator, although certainly other operating environments may be envisioned, and the filter assembly may be used in any number of environments where the filter assembly has access to, and can be placed in fluid communication with, influent and effluent fluid access ports.

Figure 4:
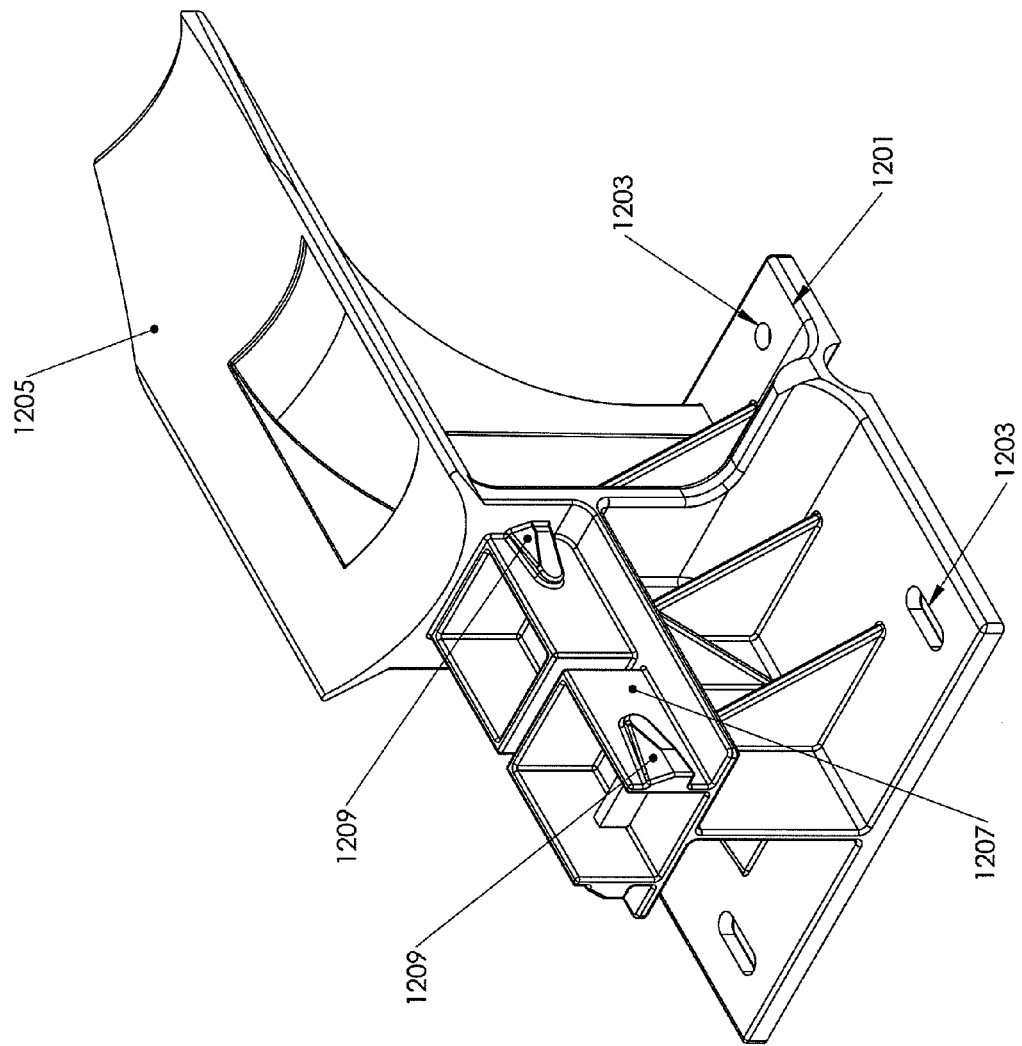
FIG. 4 is a side plan view of the filter locator of the present invention.
Figure 5:
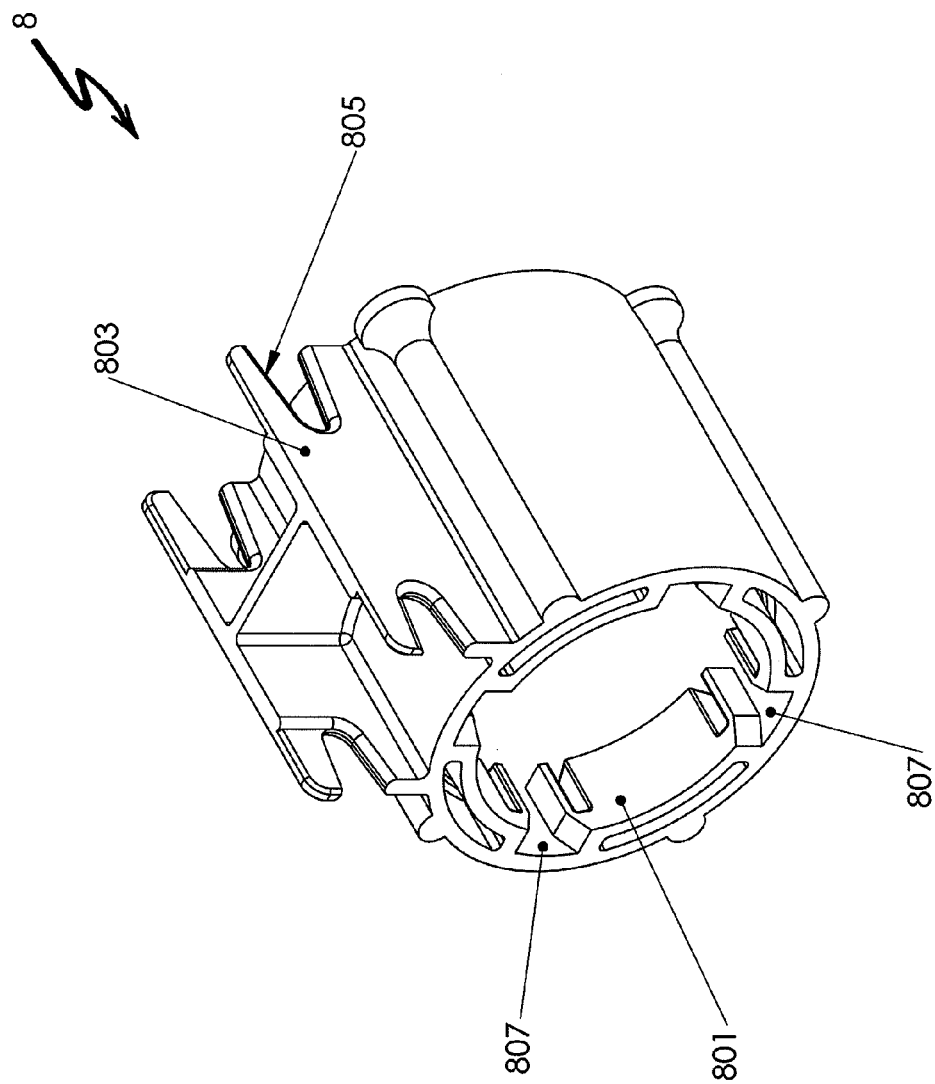
FIG. 5 is a side plan view of the filter guide of the present invention.

Water manifold 300 includes a filter locator 12, which is attachable to, and secured within, the operating environment, typically by mounting screws, although other attachment schemes are not precluded. Water manifold 300 is used to hold and support the filter housing assembly 200. As depicted in FIG. 4, the filter locator 12 is preferably made of shaped, injected molded plastic, with a mountable base 1201, and shown with slots 1203 therein for screw attachment, although other attachment schemes may be used. The filter locator 12 includes a beveled-shaped tray 1205 for receiving and supporting the filter housing assembly 200. Once the filter housing assembly 200 is inserted in and held by water filter manifold 300, tray 1205 supports the weight of the sump and filter media. A filter guide 8 removably attaches to the filter locator 12. Filter guide 8 is a cylindrical shell of a diameter large enough to internally receive a portion of the filter housing assembly 200. It includes molded formations 801 formed to receive and hold first and second internal rotator components 10, 11 that comprise the rotational, mechanical locking mechanism for the housing, discussed further herein. Referring to FIG. 5, filter guide 8 is preferably attached to filter locator 12 by a snap-lock mechanism. Extensions 803 are located at the base of filter guide 8. Each extension 803 has two slots 805 formed therein. As shown in FIG. 4, filter locator 12 includes reciprocal extensions 1207 with tabs 1209 for insertion into slots 805. Tabs 1209 are snap fitted into slots 805. It is also possible to combine filter guide 8 with filter locator 12 in one piece, such as a single injection-molded composite, and the present invention does not preclude a single piece construction as well as the preferred two-piece configuration. Filter guide 8 receives filter head 26, which is attached to filter housing 1, such that the influent and effluent prongs 2601, 2602 from filter head 26 can enter filter guide 8 while the remainder of the housing 1 rests on, and is supported by, the filter tray 1205.

Figure 6:
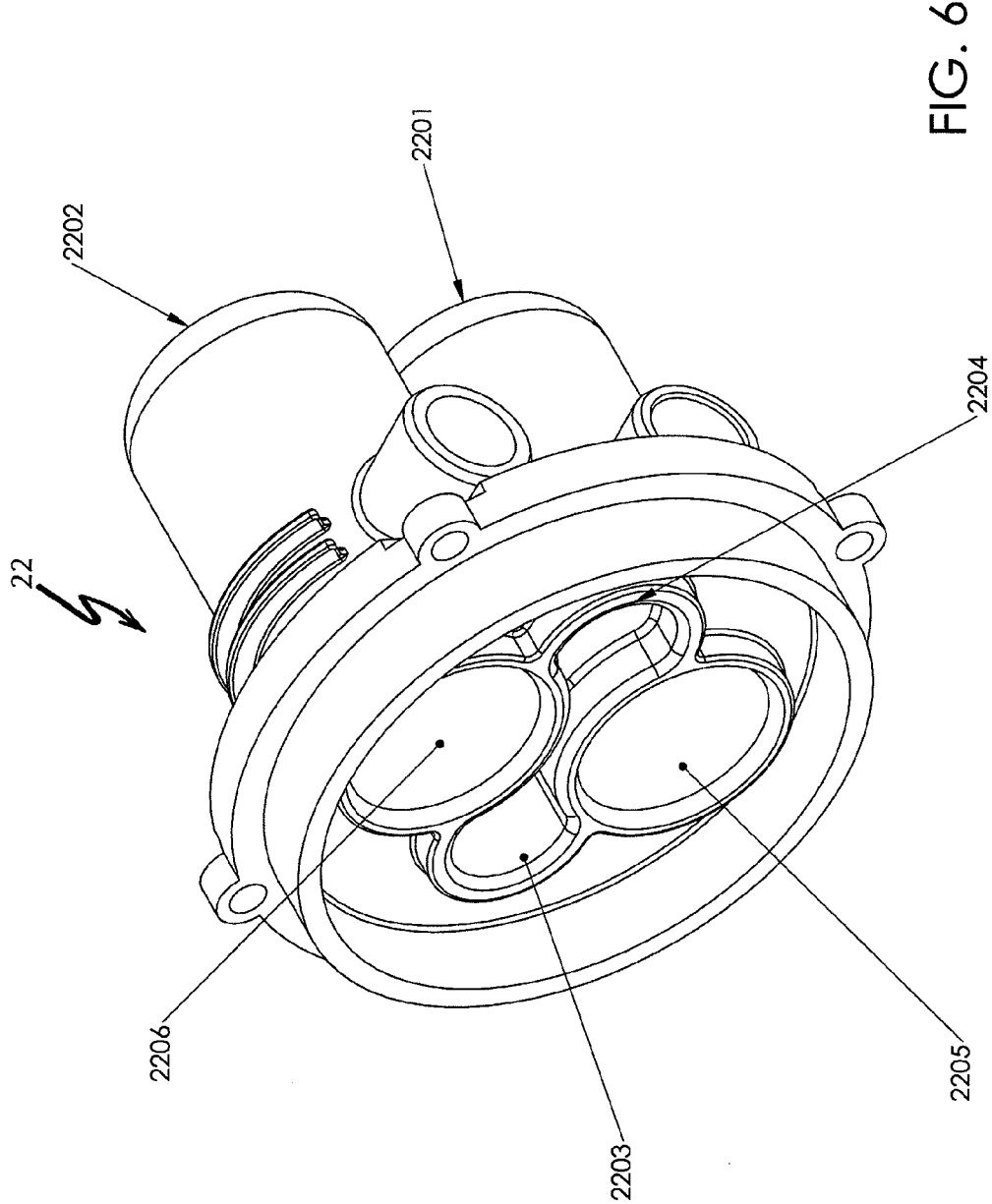
FIG. 6 is a side plan view of the rear cover of the present invention.
Figure 8:
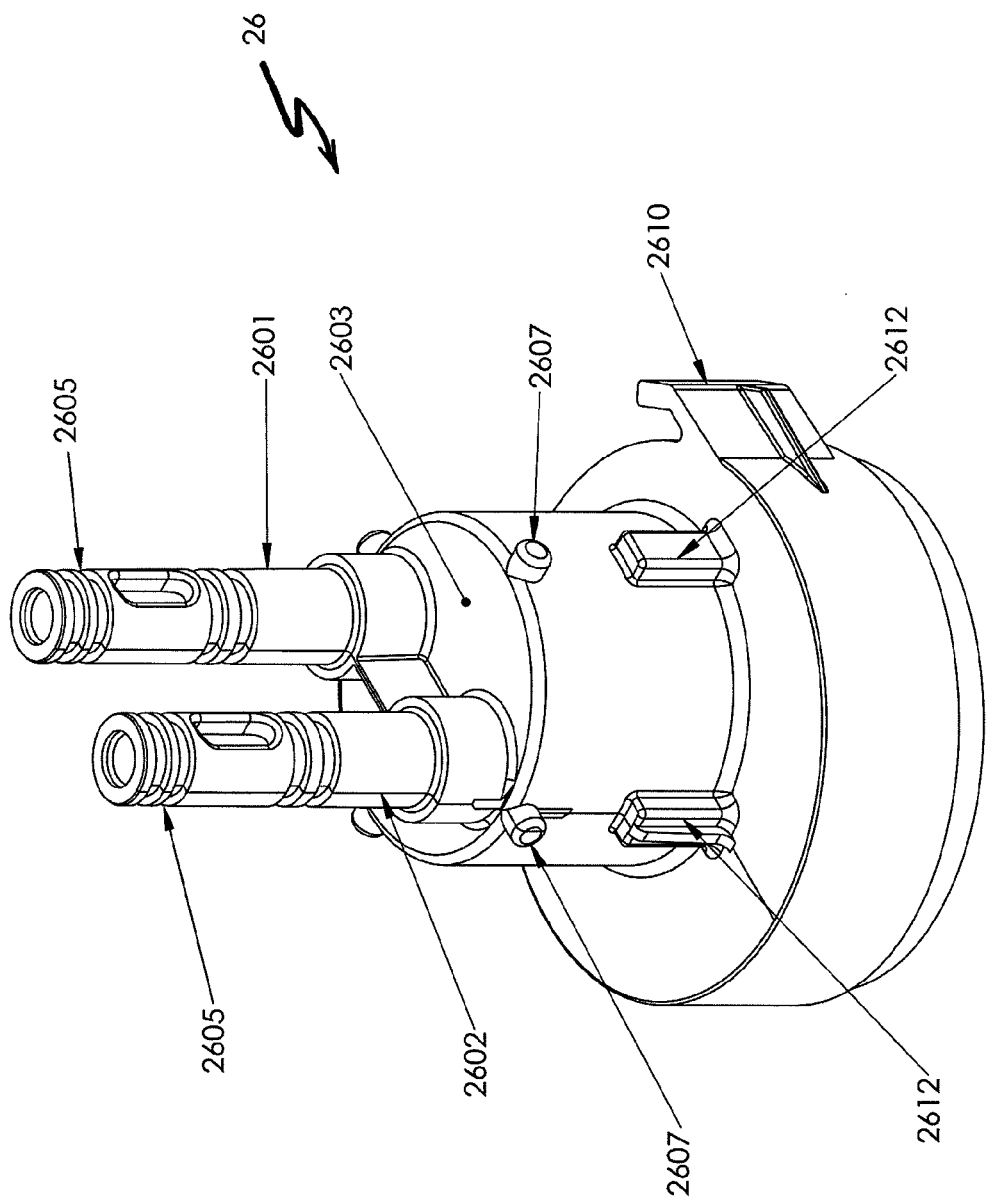
FIG. 8 is a side plan view of the filter head.

Attached to filter guide 8 is a molded rear cover 22, which has influent 2201 and effluent 2202 ports, as shown in FIG. 6. Rear cover 22 may be attached to filter guide 8 by screws, weld, epoxy bond, or other accepted attachment schemes known in the art. It is not necessary for the interface between rear cover 22 and filter guide 8 to be a watertight seal. Two compression springs 13 are located inside filter guide 8, and in contact with the inside surface of rear cover 22. In one embodiment, rear cover 22 includes two circular slots 2203, 2204 to locate each compression spring 13. Circular slots 2203, 2204 are preferably molded as part of rear cover 22, and are formed to have a diameter sufficient to preferably hold compression springs 13 by friction fit, although other attachment schemes are not precluded. Circular slots 2203, 2204 may also be located at the closed ends of the influent and effluent ports 2201, 2202, especially when the water source is being introduced radially to the filter head through a port manifold. Compression springs 13 are selected to have a predetermined spring constant $k_1$, such that, as will be discussed in greater detail herein, compression springs 13 will compress by the pushing force of compression springs 14. Rear cover 22 includes the influent and effluent port open ends 2205, 2206 on its inside or internal surface. Open ends 2205, 2206 have a diameter large enough to receive and tightly secure the influent and effluent extension tubes 901, 902 of the internal shutoff 9.

FIGS. 7A and 7B depict two side plan views of the internal shutoff 9 of the present invention. Influent extension tube 901 and effluent extension tube 902 are depicted extending from plate 903. Influent and effluent tubes 901, 902 are hollow, cylindrically shaped extensions of plate 903, and are preferably molded as one construction with plate 903; however, these tubes may also be made separately and attached to plate 903 by friction fit, weld, bonded by epoxy, or the like. Water ingress and egress slots 904, 905, located at the base of tubes 901, 902, allow fluid flow from the water source when tubes 901, 902 are fully inserted into rear cover influent and effluent port open ends 2205, 2206. Tubes 901, 902 have at least three groves 910a,b,c about the outer periphery to hold o-rings 20. Two groves 910a,b are located at each end of slots 904, 905, and a third groove 910c is located at the end of each extension tube 901, 902. There is no slot between grooves 910b and 910c. When extension tubes 901, 902 are partially removed from open ends 2205, 2206, the solid portions of extension tubes 901, 902 between groves 910b and 910c are exposed to the water pathway and prevent water flow. Slots 904, 905 are no longer in fluid communication with influent and effluent ports 2201, 2202, thereby effectively shutting off water flow to and from filter housing 1. O-rings 20 placed in each groove impedes the fluid flow with a circumferential watertight seal that precludes leakage.

Extension tubes 901, 902 protrude through plate 903 in shorter circular extensions 912 that receive influent and effluent prongs 2601, 2602 from filter head 26. Circular extensions 912 have a diameter that is slightly larger than said influent and effluent prongs 2601, 2602, and create a watertight seal with o-rings from prongs 2601, 2602 when said prongs are inserted. Two smaller, circular extensions 915 are located on plate 903 to receive compression springs 14. Circular extensions 915 are preferably molded as part of plate 903, and are formed to have a diameter sufficient to preferably hold compression springs 14 by friction fit, although other attachment schemes are not precluded. Compression springs 14 are selected to have a predetermined spring constant $k_2$, greater than spring constant $k_1$ of compression springs 13, such that, compression springs 13 will be compressed by the pushing force of compression springs 14.

When filter housing 200 is inserted within filter guide 8, prongs 2601, 2602 enter circular extensions 912. A flat mounted portion 2603 of head 26 (shown more clearly in FIG. 8) abuts compression springs 14. Further insertion of filter head 26 pushes compression springs 14 against internal shutoff 9, moving internal shutoff 9 towards rear cover 22 and thus collapsing compression springs 13, which are the less resilient of the two sets of springs. By collapsing compression springs 13 before compression springs 14 are collapsed under the axial force from the filter housing assembly 200, internal shutoff influent and effluent extension tubes 901, 902 are inserted into rear cover influent and effluent port open ends 2205, 2206. Internal shutoff 9 has tabs 913 on plate 903 that interact with rotator actuating mechanism 10, 11. When spring 13 is at its maximum extension and internal shutoff 9 is positioned away from rear cover 22, tabs 913 interface with second internal rotator 11 at gap 1112. Second internal rotator 11 has tabs 1110 and gaps 1112 that form a pocket to receive tabs 913. Tabs 1110 include a ramped-angled edge 1114 that interfaces with tab 913 causing rotation of the rotator actuating mechanism when tab 913 is slidably pressed against ramp 1114. When internal shutoff 9 is positioned against rear cover 22, tabs 913 are separated from rotator actuating mechanism 10, 11, allowing free rotation such that the axial movement of standoffs 2607 may cause rotation of the rotator actuating mechanism to occur. Conversely, when internal shutoff 9 is positioned away from rear cover 22, tabs 913 lock between gaps 1112 and prohibit rotation of rotator actuating mechanism 10, 11, while sliding in place to correctly orient the rotator actuating mechanism to receive filter head 26.

Once compression springs 13 are fully collapsed, internal shutoff 9 is abutted against influent and effluent port open ends 2205, 2206. Extension tubes 901, 902 are now fully inserted within influent and effluent ports 2201, 2202. Slots 904, 905 are positioned to allow water ingress and egress to and from the filter housing 1. Although prongs 2601, 2602 are only partially inserted within internal shutoff 9, watertight o-ring seals 2605 at the end of prongs 2601, 2602 are fully inserted to ensure no water leakage. Further compression of filter housing assembly 200 compresses springs 14, holding internal shutoff 9 in position against rear cover 22, and allowing prongs 2601, 2602 to be fully inserted within extension tubes 901, 902 and simultaneously within influent and effluent ports 2201, 2202. Fluid can now flow to and from filter housing 1.

Filter housing assembly 200 is removed and replaced by pushing the housing towards water filter manifold 300. Track pins 2610 formed on filter head 26 are shaped to slidably hold tray 1205 of filter locator 12. Filter housing assembly 200 is slid along tray 1205, guided by track pins 2610, such that standoffs 2607 and keys 2612 are received by slots 801 within filter guide 8.

Figure 9:
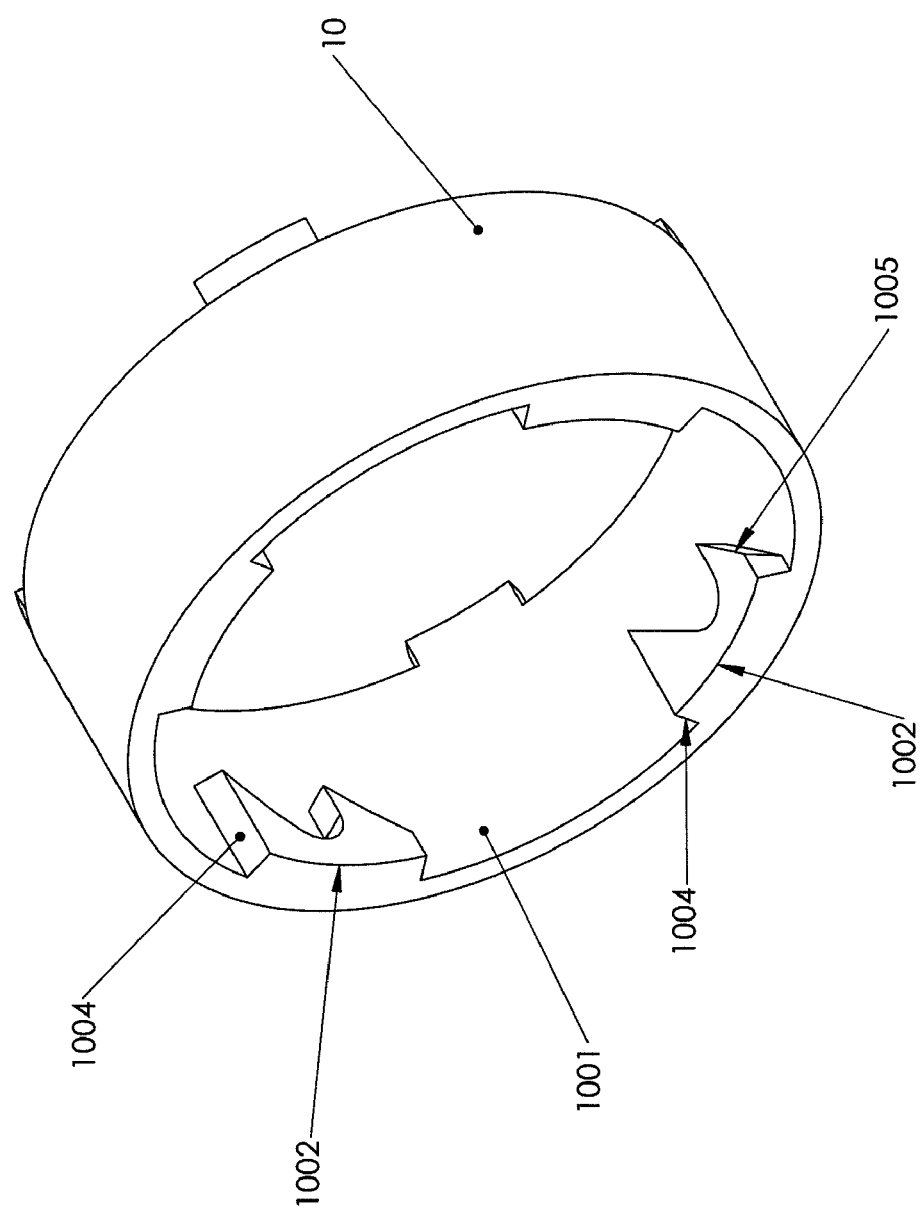
FIG. 9 is a side plan view of the first internal rotator of the present invention.
Figure 10:
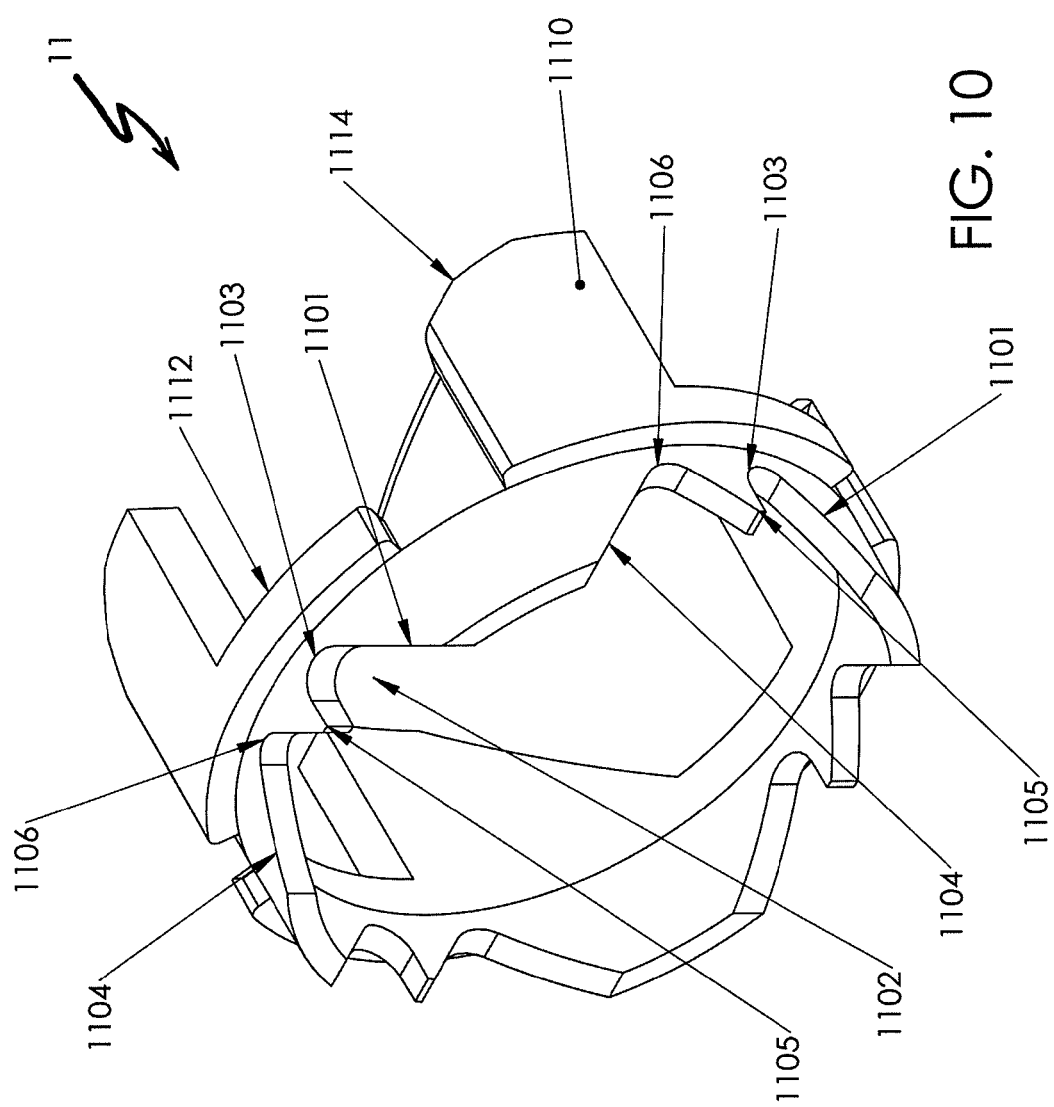
FIG. 10 is a side plan view of the second internal rotator of the present invention.

Standoffs 2607 interact with an internal rotator actuating mechanism, which includes a first internal rotator 10, depicted in FIG. 9, and a second internal rotator 11, depicted in FIG. 10. Internal rotator actuating mechanism 10, 11 is effectively a track-cam assembly that translates the linear, axial directional motion of filter housing 1 into rotational directional motion to engage the plurality of standoffs 2607 on filter head 26 to secure the filter head 26 to filter guide 8.

First internal rotator 10 works in tandem with second internal rotator 11 to receive standoffs 2607 of filter head 26. Upon insertion, standoffs 2607 are guided by slots 807 in filter guide 8 and traverse through gaps 1001 in first internal rotator 10. Gaps 1001 define the spaces between tabs 1002 on first internal rotator 10, which are preferably skewed u-shaped structures. Standoffs 2607 are pushed through gaps 1001 just adjacent to tabs 1002, and into a first skewed u-shaped section 1102 of receiving slot 1101 of second internal rotator 11, shown in FIG. 10. The pushing action is first against compression springs 13, which upon collapse, causes extensions 912 of internal shutoff 9 to insert within influent and effluent ports 2201, 2202. Once compression springs 13 are collapsed, further pushing in the same axial direction then acts against the stronger, more resilient compression springs 14.

Figure 11:
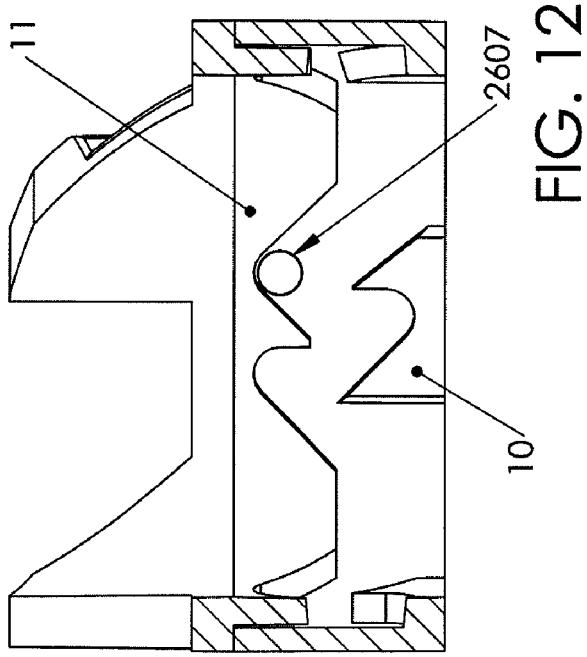
FIG. 11 depicts the position of each standoff in the first internal rotator 10, when the filter housing assembly is inserted and locked in the filter guide.

Receiving slot 1101 is a skewed dual u-shaped spacing, aligned such that the straight edge 1004 of tab 1002 points into a first skewed u-shaped cut 1102 of receiving slot 1101. This alignment directs standoffs 2607 into receiving slots 1101 upon collapse of compression springs 14. Each standoff 2607 is received by the open curvature of the skewed shaped receiving slot 1101. The skewed shaped slot rides along, and is rotated by, the linear axial force of each standoff 2607, causing the entire rotator actuating mechanism 10, 11 to turn. Forward motion is stopped when each standoff 2607 reaches the first apex 1103 of first skewed u-shaped cut 1102. At this point, compression springs 14 are partially compressed, and provide a linear, spring force in the opposite axial direction, out of filter guide 8. The forces of compression springs 13, 14 push back filter housing assembly 200 away from rear cover 22, in a direction out of filter guide 8. However, since the rotator actuating mechanism 10, 11 has rotated, each tab 1002 of first internal rotator 10 is now situated directly underneath a standoff 2607. Compression springs 13, 14 push and secure each standoff in tabs 1002, securing filter housing assembly 200 in place. FIG. 11 depicts the position of standoff 2607 in first internal rotator 10, when filter housing assembly 200 is locked in position in filter guide 8.

Figure 12:
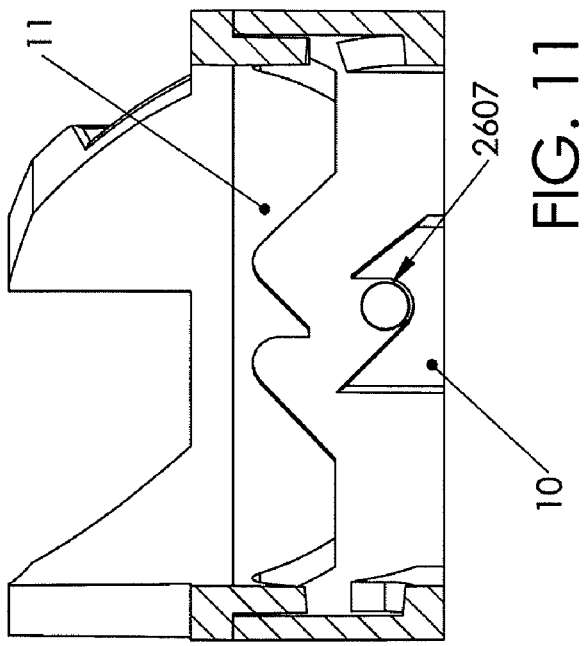
FIG. 12 depicts the positional relationship of filter head standoffs and the rotator actuating mechanism when standoffs are at the apex of the second unshaped cut of the second internal rotator.

To remove filter housing assembly 200 from its locked position in filter guide 8, a user pushes the housing towards the filter guide, in the same manner that one would push the housing to insert it. This axial pushing motion towards filter guide 8, compresses springs 14 and lifts standoffs 2607 out of tabs 1002. Standoffs 2607 are guided by center extrusion 1105 of second internal rotator 11 into a second skewed u-shaped cut 1104 of receiving slot 1101. As standoffs 2607 progress towards apex 1106 of second u-shaped cut 1104, the rotator actuating mechanism 10, 11 rotates in the same direction that it turned during insertion, such that a second edge 1005 of tab 1002 is positioned off-center of standoff 2607. At this juncture, filter housing assembly 200 cannot progress any further into filter guide 8. FIG. 12 depicts the positional relationship of standoffs 2607 and rotator actuating mechanism 10, 11 when standoffs 2607 are at the apex of the second u-shaped cut 1104 of second internal rotator 11. Compression springs 13, 14 provide the removal force to push filter housing assembly 200 out of filter guide 8. The axial movement outwards of standoffs 2607 further rotate the rotator actuating mechanism 10, 11, again in the same direction as it has been continuously rotating, to position it for tabs 913 to interface with and slidably rotate ramp 1114 of second internal rotator 11.

Figure 14A:
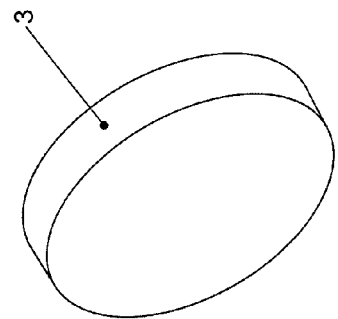
FIGS. 14A & 14B are a side plan views of the closed end cap of the present invention.
Figure 13:
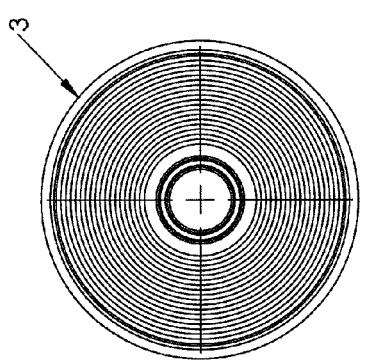
FIG. 13 is a side plan view of the open end cap of the present invention.
Figure 14B:
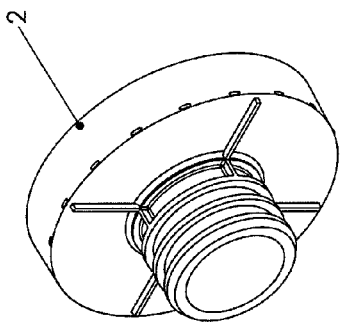

After insertion, filter head 26 is in fluid communication with the influent water flow, which traverses to influent prong 2601, through filter media 4, to effluent prong 2602. Water flow is directed through filter media 4 by an open end cap 2, depicted in FIG. 13, and sealed to the top of filter media 4. A closed end cap 3, depicted in FIGS. 14A and 14B, is sealed to the bottom of filter media 4. Open end cap 2 and closed end cap 3 are fixably attached to filter media 4. The capped filter media is encased in filter housing or sump 1 which is accurably attached to filter head 26 in a watertight seal. This attachment may be accomplished in a variety of ways, for example, by screw threading means, clamping means, gluing means, welding means, or the like. Open end cap 2 inserts within filter head 26 and creates a watertight seal with o-ring 6 between the two structures.

Filter housing 1 is depicted in greater detail in FIG. 2. The housing is a hollow cylindrical construction having a closed end 201 and an open end 203. Open end 203 has a diameter large enough to receive cylindrical filter media 4. Gripping grooves 205 are located circumferentially about the outside of the filter housing 1 towards closed end 201.

It is envisioned that the preferred embodiment of the present invention would be disposed in a refrigerator, most likely within the door. The water source to the refrigerator would be in fluid communication with the filter assembly, allowing for easy changing of the sump and filter media from the refrigerator. The output of the filter assembly may be selectively coupled to a water dispenser or an ice dispenser.

As previously discussed, all parts of the filter housing and sump containing said filter media can be made using molded plastic parts according to processes known in the art. The filter media may be made from known filter materials such as carbon, activated carbons, malodorous carbon, porous ceramics and the like. The filter media, which may be employed in the filter housing of the instant invention, includes a wide variety of filter media capable of removing one or more harmful contaminants from water entering the filter housing apparatus. Representative of the filter media employable in the filter housing include those found in U.S. Pat. Nos. 6,872,311, 6,835,311, 6,797,167, 6,630,016, 6,331,037, and 5,147,722. In addition, the filter composition disclosed in the following Published Applications may be employed as the filter media: US 2005/0051487 and US 2005/00111827.

The filter assembly is preferably mounted on a surface in proximity to a source of water. The mounting means, depicted as water filter manifold 300, are also preferably in close proximity to the use of the filtered water produced by the filter housing apparatus.

Figure 16:
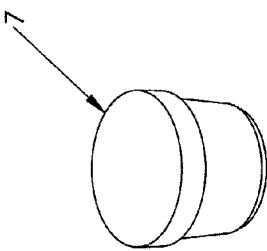
FIG. 16 is a side plan view of the filter plug.
Figure 15:
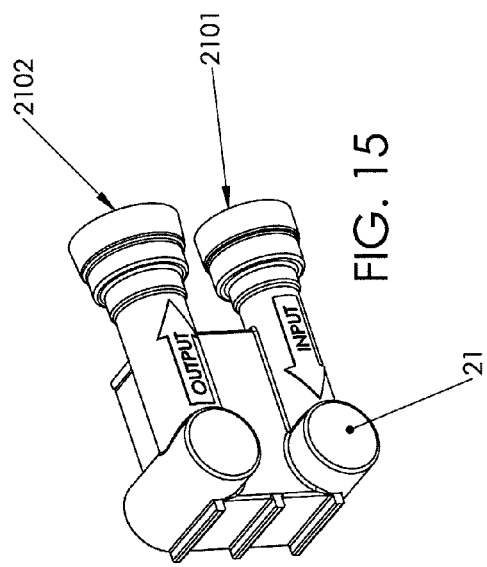
FIG. 15 depicts a side plan view of the port manifold.

A port manifold 21 may be attached to rear cover 22 as an alternative water source inlet. The preferred embodiment is to use a port manifold 21 to connect the water source so that water enters and exits the rear cover influent and effluent ports 2201, 2202, radially. The alternative embodiment, where a port manifold is not utilized, has the water entering and exiting axially from the rear cover influent and effluent ports 2201, 2202. In the preferred scheme, using port manifold 21, rear cover influent and effluent ports 2201, 2202 have closed axial ends and radial slots for water ingress and egress. FIG. 15 depicts a side plan view of the port manifold 21. Influent port 2101 and effluent port 2102 replace the water source connections to influent 2201 and effluent 2202 ports of rear cover 22. FIG. 16 depicts an axial plug 7 for rear cover influent and effluent ports 2201, 2202 when port manifold 21 is used. In an alternative embodiment, the closed axial ends of the rear cover ports may be constructed of one injection molded piece with the port prongs. Port manifold 21 may be attached to rear cover 22 by a number of attachment schemes commonly known in the art, such as snap fittings, friction, epoxy bond, sonic weld, and the like, and the attachment is not limited to any particular scheme. Moreover, port manifold 21 may be formed from the same construction design as rear cover 22 in one injection-molded piece. Influent and effluent ports 2201, 2202 may be sealed using a plug, or alternatively, may be molded as closed ports, with water access only through port manifold 21.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A filter assembly comprising:
    a filter housing including:
        a sump for enclosing a filter having a filter media;
        a filter head having an inlet and an outlet in fluid communication with said filter media, and at least one standoff located on said filter head housing, said at least one standoff protruding outwards from said filter head housing for use in securing said filter head to a filter manifold;
    said filter manifold comprising:
        a filter locator having a tray for mounting said filter head and supporting said sump;
        a filter guide having a rotator actuating mechanism to secure and hold said filter head in place when said filter head is axially inserted within said filter guide, said rotator actuating mechanism having tabs and slots that rotate upon a transverse axial force from said at least one standoff and from tabs on an internal shutoff;
        said internal shutoff having tabs and an inlet extension and an outlet extension with apertures for fluid ingress and egress, said internal shutoff in fluid communication with said filter head inlet and outlet during filtering operation, said internal shutoff tabs slidably contacting and aligning said rotator actuating mechanism to secure and remove said filter head; and
        a rear cover having inlet and outlet ports in fluid communication on an internal side with said filter head inlet and outlet, and in fluid communication on an external side with a fluid source.

2. The filter assembly of claim 1 where said internal shutoff includes a plurality of fluid-tight seals about said inlet extension and said outlet extension such that fluid flow from said fluid source is blocked by said plurality of fluid-tight seals on said extensions when said internal shutoff is at least partially removed from said rear cover inlet and outlet ports, and wherein said internal shutoff inlet and outlet extensions are in fluid communication with said filter media when said filter head inlet and outlet are inserted within said internal shutoff inlet and outlet extensions.

3. The filter assembly of claim 1 including a first spring having a first spring constant and in contact with said internal shutoff on a side closest to said fluid source, and a second spring having a second spring constant and in contact with said internal shutoff on a side opposite said first spring, wherein said second spring constant is greater than said first spring constant, such that said first spring compresses and collapses before said second spring when axial force is applied simultaneously to both of said springs.

4. The filter assembly of claim 1 wherein said filter comprises an open end cap and a closed end cap, said caps fixably attached to said filter media, said open end cap having an inlet port for unfiltered fluid to enter said filter media and an outlet port for filtered fluid to exit said filter media.

5. The filter assembly of claim 1 wherein said rotator actuating mechanism comprises a first internal rotator and a second internal rotator.

6. The filter assembly of claim 5 wherein said first internal rotator includes tabs for directing and securing said at least one standoff when said filter head is inserted in said filter guide.

7. The filter assembly of claim 6 wherein said second internal rotator includes tabs and shaped slots therebetween that receive said standoff at least one and rotate said rotator actuating mechanism when transverse axial force is applied by said standoffs to said shaped slots.

8. The filter assembly of claim 3 wherein said internal shutoff compresses said first spring when said filter head is pushed into said filter guide with an axial force against said second spring, said second spring collapsing when said first spring is collapsed and said internal shutoff is in contact with said rear cover, such that said internal shutoff is positioned to permit fluid communication with said filter media when said first spring is collapsed, and is positioned to prevent fluid communication with said fluid source when said first spring is fully extended.

9. The filter assembly of claim 1 wherein said filter head further includes track pins shaped to slidably secure to said tray.

10. The filter assembly of claim 4 including a peripheral seal circumferentially seated about said open end cap for sealing with said filter head.

11. The filter assembly of claim 5 wherein said first internal rotator is fixably attached to said second internal rotator, or said first internal rotator and said second internal rotator are formed in a single piece construction.

12. The filter assembly of claim 1 wherein said filter media includes material for removing impurities selected from the group comprising microbiological contaminants, dirt, organic acids, and mixtures thereof.

13. The filter assembly of claim 1 wherein said filter head comprises:
    a first hollow cylindrically shaped portion of a first diameter, having an internal end and an external end, said first diameter large enough to mate with, and seal to, said sump;
    a second hollow cylindrically shaped portion of a second diameter, said second diameter smaller than said first diameter, said second cylindrically shaped portion located off axial center from said first cylindrically shaped portion and having a first end attached to said external end of said first cylindrically shaped portion, and an opposite second end wherein said filter head inlet and outlet extend from said second cylindrically shaped portion;
    said at least one standoff located on said second cylindrically shaped portion;
    at least one molded key located on said second cylindrically shaped portion to facilitate guiding said filter head into said filter guide; and
    track pins located on said first cylindrically shaped portion and shaped to slidably secure said filter head to said tray.

14. A filter housing comprising:
    a sump for enclosing a filter having filter media; and a filter head having an inlet and an outlet for fluid ingress and egress, attached to said sump with a fluid-tight seal, including:
a first hollow cylindrically shaped portion of a first diameter, having an internal end and an external end, said first diameter large enough to mate with, and seal to, said sump;
a second hollow cylindrically shaped portion of a second diameter, said second diameter smaller than said first diameter, said second cylindrically shaped portion located off axial center from said first cylindrically shaped portion and having a first end attached to said external end of said first cylindrically shaped portion, and an opposite second end wherein said filter head inlet and outlet extend from said second cylindrically shaped portion;
at least one standoff located on said second cylindrically shaped portion; and
a plurality of molded keys located on said second cylindrically shaped portion to facilitate guiding said filter head into a compatibly configured filter guide.

15. The filter housing of claim 14 further comprising track pins located on said first cylindrical component and shaped to slidably secure said filter head to a compatibly configured mounting manifold tray.

16. The filter housing of claim 14 further including said filter comprising an end cap and an open cap, said caps fixably secured thereto, said open cap having a peripheral seal for securing a liquid-tight connection to said filter head when said filter is placed within said sump, and said sump is fixably attached to said filter head.

17. The filter housing of claim 14 wherein said opposite end of said second hollow cylindrically shaped portion includes a flat surface to support contact and compression of one or more springs.

18. The filter housing of claim 14 further including circumferential grooves on said filter head inlet and outlet for securing fluid-tight seals when said filter housing is inserted in a compatible filter manifold.

19. The filter housing of claim 18 wherein said seals include o-rings or gaskets.

20. The filter housing of claim 14 wherein said inlet and outlet include apertures at located at each end for fluid ingress and egress.

21. The filter housing of claim 14 wherein said inlet and outlet include apertures located on each side for fluid ingress and egress.

22. The filter housing of claim 14 wherein said inlet and outlet comprise cylindrically shaped structures.

23. A filter assembly comprising:
a filter housing including:
a sump for enclosing a filter having a filter media, said filter having an end cap and an open cap;
a filter head having an inlet and an outlet in fluid communication with the filter media, said filter head being fixably attached to said sump, said inlet and outlet including grooved tracks above and below a slotted aperture, said filter head including:
a first hollow cylindrically shaped portion of a first diameter, having an open end and a closed end, said first diameter large enough to mate with, and seal to, said sump;
a second hollow cylindrically shaped portion of a second diameter, said second diameter smaller than said first diameter, said second cylindrically shaped portion located off axial center from said first cylindrically shaped portion and having a first end attached to said closed end of said first cylindrically shaped portion, and an opposite second end wherein said filter head inlet and outlet extend from said second cylindrically shaped portion;
at least one standoff located on said second cylindrically shaped portion; and
a plurality of molded keys located on said second cylindrical component to facilitate guiding said filter head into a compatibly configured filter guide; and
a filter manifold including:
a filter locator having a tray for mounting said filter head and supporting said sump;
a filter guide having a rotator actuating mechanism to secure and hold said filter head in place when said filter head is inserted within said filter guide, said rotator actuating mechanism having tabs and slots that rotate upon a transverse axial force from at least one standoff, said rotator actuating mechanism including: a first internal rotator and a second internal rotator, said first internal rotator includes tabs for directing and securing said at least one standoff when said filter head is inserted in said filter guide, said second internal rotator includes tabs and shaped slots therebetween that receive said at least one standoff and rotate said rotator actuating mechanism when transverse axial force is applied to said shaped slots;
a rear cover having inlet and outlet ports in fluid communication on one side with said filter head inlet and outlet, and in fluid communication on an opposite side with a fluid source; and
an internal shutoff having an inlet extension and an outlet extension, and associated with the sump and filter head which activates when said filter head is removed from said filter guide, said internal shutoff including:
a plurality of fluid-tight seals about said inlet extension and said outlet extension such that fluid flow from a fluid source is blocked by said plurality of fluid-tight seals on said extensions when said internal shutoff is at least partially removed from said rear cover inlet and outlet ports, and wherein said internal shutoff inlet and outlet extensions are in fluid communication with said filter media when said filter head inlet and outlet are inserted within said internal shutoff inlet and outlet extensions; and
a first spring having a first spring constant and in contact with said internal shutoff on a side closest to a water source, and a second spring having a second spring constant and in contact with said internal shutoff on a side opposite said first spring, wherein said second spring constant is greater than said first spring constant, such that said first spring compresses and collapses before said second spring when axial force is applied simultaneously to both of said springs.

24. A refrigerator in combination with a filter assembly comprising:
an outer cabinet;
a refrigeration compartment disposed within said outer cabinet and having a rear wall, a pair of opposing side walls, at least one door disposed opposite said rear wall, a top and a bottom;
a freezer compartment disposed in said outer cabinet and adjacent to said refrigeration compartment;
a water dispenser disposed in said door and in fluid communication with said filter assembly with automated assembly for changing a sump and filter media from said refrigerator;

said filter assembly comprising:

a filter housing including:

a sump for enclosing a filter having a filter media;

a filter head having an inlet and an outlet in fluid communication with said filter media, and at least one standoff located on said filter head, said at least one standoff protruding outwards from said filter head for use in securing said filter head to a filter manifold;

said filter manifold comprising:

a filter locator having a tray for mounting said filter head and supporting said sump;

a filter guide having a rotator actuating mechanism to secure and hold said filter head in place when said filter head is axially inserted within said filter guide, said rotator actuating mechanism having tabs and slots that rotate upon a transverse axial force from said at least one standoff and from tabs on an internal shutoff;

said internal shutoff having tabs and an inlet extension and an outlet extension with apertures for fluid ingress and egress, said internal shutoff in fluid communication with said filter head inlet and outlet during filtering operation, said internal shutoff tabs slidably contacting and aligning said rotator actuating mechanism to secure and remove said filter head; and a rear cover having inlet and outlet ports in fluid communication on an internal side with said filter head inlet and outlet, and in fluid communication on an external side with said water source.

25. The combination according to claim 24 having an ice dispenser disposed in said door and in fluid communication with said filter assembly.

26. The combination according to claim 24 wherein said internal shutoff includes a plurality of fluid-tight seals about said inlet extension and said outlet extension such that fluid flow from said water source is blocked by said plurality of fluid-tight seals on said extensions when said internal shutoff is at least partially removed from said rear cover inlet and outlet ports, and wherein said internal shutoff inlet and outlet extensions are in fluid communication with said filter media when said filter head inlet and outlet are inserted within said internal shutoff inlet and outlet extensions.

27. The combination according to claim 24 including a first spring having a first spring constant and in contact with said internal shutoff on a side closest to said water source, and a second spring having a second spring constant and in contact with said internal shutoff on a side opposite said first spring, wherein said second spring constant is greater than said first spring constant, such that said first spring compresses and collapses before said second spring when axial force is applied simultaneously to both of said springs.

28. The combination according to claim 24 wherein said filter media comprises an open end cap and a closed end cap, said caps fixably attached to said filter media, said open end cap having an inlet port for unfiltered water to enter said filter media and an outlet port for filtered water to exit said filter media.

29. The combination according to claim 24 wherein said rotator actuating mechanism comprises a first internal rotator and a second internal rotator.

30. The combination according to claim 29 wherein said first internal rotator includes tabs for directing and securing said at least one standoff when said filter head is inserted in said filter guide.

31. The combination according to claim 30 wherein said second internal rotator includes tabs and shaped slots therebetween that receive said at least one standoff and rotate said rotator actuating mechanism when transverse axial force is applied by said at least one standoff to said shaped slots.

32. The combination according to claim 27 wherein said internal shutoff compresses said first spring when said filter head is pushed into said filter guide with an axial force against said second spring, said second spring collapsing when said first spring is collapsed and said internal shutoff is in contact with said rear cover, such that said internal shutoff is positioned to permit fluid communication with said filter media when said first spring is collapsed, and is positioned to prevent fluid communication with said water source when said first spring is fully extended.

33. The combination according to claim 24 wherein said filter head further includes track pins shaped to slidably secure to said tray.

34. The combination according to claim 28 including a peripheral seal circumferentially seated about said open end cap for sealing with said filter head.

35. The combination according to claim 29 wherein said first internal rotator is fixably attached to said second internal rotator, or said first internal rotator and said second internal rotator are formed in a single piece construction.

36. The combination according to claim 24 wherein said filter housing is mounted in a compartment in said sidewalls, said rear wall, or said door.

* * * * *

UNITED STATES PATENT AND TRADEMARK OFFICE
CERTIFICATE OF CORRECTION

PATENT NO. : 7,442,301 B2  
APPLICATION NO. : 11/511599  
DATED : October 28, 2008  
INVENTOR(S) : Stephen P. Huda It is certified that error appears in the above-identified patent and that said Letters Patent is hereby corrected as shown below:

Column 6:

Line 7, delete "a".

Column 11:

Claim 1, Line 47, delete "ports".

Column 12:

Claim 7, Line 17, delete "standoff at least one" and substitute therefore -- at least one standoff --.

Claim 14, Line 67, delete "having" and substitute therefore -- having a --.

Column 14:

Claim 23, Line 27, delete "ports".

Column 16:

Claim 28, Line 6, delete "media".

Signed and Sealed this

Fourteenth Day of July, 2009

JOHN DOLL  
*Acting Director of the United States Patent and Trademark Office*